United States Patent [19]

Kueschall

[11] Patent Number: 4,852,899

[45] Date of Patent: Aug. 1, 1989

[54] LIGHTWEIGHT WHEELCHAIR ADJUSTABLE FOR A SPECIFIC BALANCE

[76] Inventor: Rainer Kueschall, Oetlingerstrasse 82, 8057 Basel, Switzerland

[21] Appl. No.: 74,909

[22] Filed: Jul. 17, 1987

[30] Foreign Application Priority Data

Jul. 31, 1986 [CH] Switzerland ........................ 03071/86

[51] Int. Cl.⁴ ................................................ B62M 1/14

[52] U.S. Cl. .................................... 280/250.1; 33/337; 280/288.4; 280/657; 280/661; 280/840; 297/383; 297/DIG. 4

[58] Field of Search ............... 280/242 WC, 289 WC, 280/657, 6 R, 661, 673, 677; 297/DIG. 4, 383; 33/333, 337, 338, 347, 370, 371, 372, 373

[56] References Cited

U.S. PATENT DOCUMENTS

| | | | |
|---|---|---|---|
| Re. 32,242 | 9/1986 | Minnebraker | 280/242 WC |
| 818,293 | 4/1906 | Rich | 297/383 |
| 3,775,859 | 12/1973 | Sauterel | 33/338 |
| 3,885,813 | 5/1975 | Kern | 280/763.1 |
| 4,358,125 | 11/1982 | Charles | 280/242 WC |
| 4,360,213 | 11/1982 | Rudwick et al. | 280/242 WC |
| 4,405,142 | 9/1983 | Whetstine | 280/242 WC |
| 4,500,102 | 2/1985 | Haury et al. | 280/242 WC |
| 4,572,533 | 2/1986 | Ellis et al. | 280/242 WC |
| 4,592,570 | 6/1986 | Nassiri | 280/242 WC |
| 4,650,201 | 3/1987 | Hartwell | 280/242 WC |
| 4,679,816 | 7/1987 | Riikonen | 280/242 WC |
| 4,682,783 | 7/1987 | Kuschall | 280/242 WC |

FOREIGN PATENT DOCUMENTS

| | | | |
|---|---|---|---|
| 182164 | 1/1963 | Sweden | 297/DIG. 4 |

OTHER PUBLICATIONS

Sports and Spokes, vol. 11, No. 6, "Adjustability in Lightweight Wheelchairs", pp. 12-16, 3-1986.

*Primary Examiner*—Charles A. Marmor
*Assistant Examiner*—Eric Culbreth

[57] ABSTRACT

By adjusting two telescoping-type interengaging shiftable parts for each of two frame bars (3,4) of a support frame (2) of a lightweight wheelchair (1), the sitting position of the same can be adjusted with respect to the seat surface (5) and with it the adjustment of the center of gravity can be dynamically adjusted with respect to the user. Additional adjustment possibilities by means of each support element (17) at the right and left sides of the seat surface (5) with respect to the rear axle as well as corresponding clamping devices for the front wheels (9,10) on the frame (2) allow a very precise user-compatibility in this lightweight wheel chair. Additionally a backrest (6) can be collapsed with respect to the seat surface (5) by means of handles (20) pivotally connected with the frame bars, to thereby permit the lightweight wheelchair (1) to be compactly folded up for transportation purposes.

11 Claims, 4 Drawing Sheets

LIGHTWEIGHT WHEELCHAIR ADJUSTABLE FOR A SPECIFIC BALANCE

With the growing participation of wheelchairs in sports, greatly increased demands have been placed upon the balance and as well the general maneuverability of a wheelchair. In this regard decisive meaning has been attached to the maneuvering speed of the so-called sportschairs, in particular with the basketball wheelchairs.

Modification of the center of gravity of a chair raises or lowers the maneuvering speed of these chairs. However, on the one hand it should not be forgotten that each modification of the center of gravity naturally changes and affects the stability and/or tipping possibilities of the device with increasing scale.

Further, it is generally recognized that the more a person moves the axles for the two load bearing rear wheels rearwardly, that is, displacement in the direction opposite from the two front wheels of the wheelchair, the more stabilization is gained for the wheelchair as such. On the other hand, with such adjustment the front part of the wheelchair becomes heavier and heavier—as is apparent from its own weight—and with this, naturally, comes worse maneuverability.

Besides the individual possibilities of shifting the center of gravity, there is also the need to take into consideration for today's state of the art the various adjusting possibilities for the angle of the seat, the angle of the backrest in regard to the seat surface as well as the adjustment possibility of the camber of the rear wheels in order to shift the height of the center of gravity.

For adjusting the center of gravity in relation to the seat surface one can make use of essentially two adjustment criteria in the state of the art (see for example SPORTS AND SPOKES, The Magazine for Wheelchair Sports and Recreation, March-April 1986, Vol. 11, No. 6, "Adjustability in Lightweight Wheelchairs"). For structural solutions to the shifting of the center of gravity below the seat surface of a wheelchair one utilizes a rearrangement of the two large drive wheels of the wheelchair. These two drive wheels are for the most part repositionable back and forth along their axes in longitudinal guides of the so-called axial support plates. By this means the wheels themselves can be adjusted in a direction closer to or further from the smaller front wheels.

For angular adjustment of the seat back of the wheelchair with respect to the seat surface, the so-called "positioning angle" has been primarily employed in the prior art. By this means the seat back is adjusted for each application and then is fixedly blocked in the adjustment position by means of this positioning angle.

In addition, in the prior art the two front wheels are not directly connected with the frame bars of the seat surface, but instead they are pivotally connected to this frame so that they work as carrying bars which extend parallel to the seat surface frame bars. In this regard, they are also angularly adjustable as is illustrated for example on page 15 of the publication mentioned immediately above.

It has also been established in the prior art to be a serious disadvantage firstly that precise adjustment of the three interrelated adjustment parameters with respect to one another, these being the position of the axles of the rear wheels, the position of the axles of the front wheels and the angle between the seat surface and the back rest, is achieved only with great difficulty. For this the two rear heels in certain constructions are always individually adjustable, that is, the axles of each individual wheel are separately and distinctly adjusted. It is therefore not difficult to demonstrate how easily a small change in the setting of one wheel axis can affect the other wheel axis. Now this however, leads to a skewing of the actual wheel axis relative to the seat surface of the wheelchair, and with it a disadvantageous modification of the balance and also—quite substantially—the tracking of the wheelchair. Still more severely dominant however is the shifting which thereby occurs such that the fixing means of one wheel becomes disassociated from the other wheel and introduces the possibility of a completely unexpected shifting of one wheel axis with respect to the opposing wheel axis.

The permanent fixing of the back rest in a position selected on one occasion yields indeed a maximum of stability. However, very often it is simply not necessary and is perceived to be disadvantageous in comparison to a rapid adjustment. Additionally, the transportability of the wheelchair is made considerably more difficult with a stationary (fixedly secured) backrest.

Also the modularly constructed and pivoted suspension of the two front wheels in wheelchair systems according to the prior art has the disadvantage that it is not easily inspected (replacement of smaller or correspondingly larger front wheels often necessitates a change of the entire suspension), and adjustment down to the precise millimeter is apparently not possible.

The camber adjustment of the two rear (support) wheels of a wheelchair according to the prior art (see the above-mentioned publication page 13, righthand column) is realized such that the above-mentioned guide rails for the axles of the rear wheels with the corresponding longitudinal slots or, correspondingly, carrier plates are inclined with respect to the horizontal, and the collars or washers are positioned above the lower fastening bolts so that the longitudinal guides assume a certain inclined position. This has various disadvantages, one being that a precise adjustment with this type of collar is barely possible and another being that practice has shown that with such collars the same inclined adjustment for both rear wheels can only be achieved simultaneously at great expense.

With known wheelchairs it should be noted further that as additional means for achieving height adjustment the corresponding axle plates of the rear wheel support can be secured in various positions to the frame of the wheelchair.

All of these above-mentioned adjustments or positioning possibilities, such as the front wheels and also as well the rear wheels of the wheelchair or correspondingly of the axles have indeed the principal disadvantage that they only permit changes by means of the so-called static changes of the individual adjustments and that besides the considerable expense which is run up, an absolutely precise compatibility of the individual, interdependent adjustments is not possible.

It is therefore an object of the present invention to provide a lightweight wheelchair whose center of gravity can be quickly changed and which comprises the greatest possible functionality. This object is achieved by means of telescopic-type cooperation of two parts of a frame bar—in order to telescopically extend or shorten each one in relation to the back rest according to the requirements of the seat level. This, on the other hand shifts the center of gravity of the body with respect to the drive wheels to achieve a rapidly attainable and effective influence on the balance point of the wheelchair, and the maneuverability nd turning ability of the novel lightweight wheelchair offer balance control, which leaves only the customary fore and aft repositioning of the rear wheels on the frame—as was common in the prior art.

A further embodiment advantageously provides a front wheel suspension infinitely adjustable in height at the front frame bars. With this, particularly on the one hand, the standard differences in the various front wheel sizes can be taken into consideration and can be most precisely adjusted. On the other hand, a continuous lowering or raising of the front frame body can be achieved also. Here also an adjustment precise down to the millimeter can be achieved for the frame, the ground height, the front wheel dimensions, and the front wheel track with one and the same component (the frame bar).

A still further development offers the continuous height adjustment of the rear axle with respect to the frame or correspondingly the seat surface, which height adjustment is regulatable with a clamp block. In order to be able to adjust for each negative wheel adjustment with millimeter precision, or if the seat angle is to be changed or the track is to be restored, a spirit level is provided in the center of the fixed, continuous axle guide according to a further embodiment of the invention. An angled bore of the rear wheel axes for housing the actual wheel axles yields a further advantage in that the actual—common—rear axle is entirely level and thereby any spring effect—along this axle—is avoided.

BRIEF DESCRIPTION OF THE DRAWINGS

Exemplary embodiments of the invention are described with reference to the drawings in which.

DESCRIPTION OF THE PREFERRED EMBODIMENTS

Figure 1:
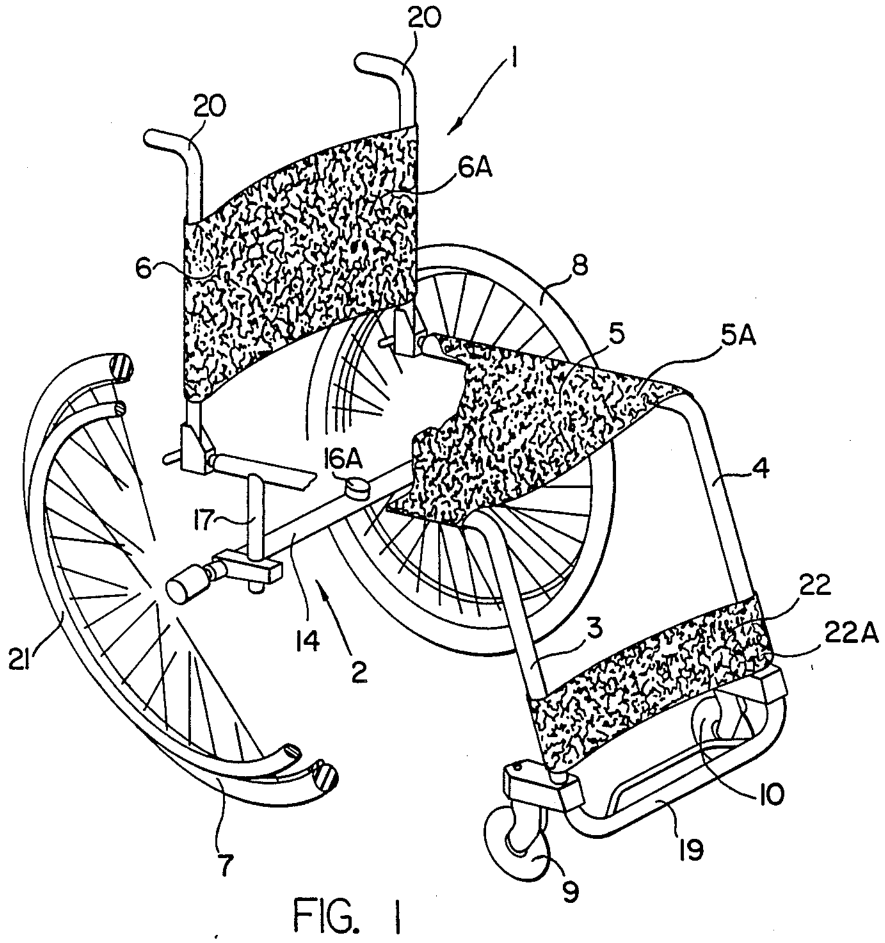
FIG. 1 is a perspective illustration of the first embodiment of the lightweight wheelchair according to the present invention.

The lightweight wheelchair 1 illustrated in FIGS. 1–6 is comprised in the traditional manner by a support frame 2, two rear wheels 7 and 8 and two front wheels 9 and 10. Between the two frame bars 3 and 4 are mounted a web 5A forming the seat surface 5 on the one hand and a web 22A forming a leg support 22 on the other hand. The connection of the two frame bars 3 and 4 produces a footrest 19. Two handles 20 are connected with the frame bars 3 and 4, and the back rest 6 is provided by a backrest web 6A. The two rear wheels 7 and 8 are connected together by means of fixed rear axle 14. The frame bars 3 and 4 are each supported over the rear axle by means of a support element 17 and a retaining device 18. In case the rear wheels must be set with a camber adjustment, the rear axle 14 has a spirit level 16A by which each of the axles in the retaining devices 18 is turned or rotated after adjustment of the two front wheels 9 and 10 until the spirit level is at its level point, that is until the two rear wheels are precisely parallel to the direction of movement and with it no so-called "death of the chair", that is, an unnecessarily large increase in the frictional resistance is introduced.

Figure 2:
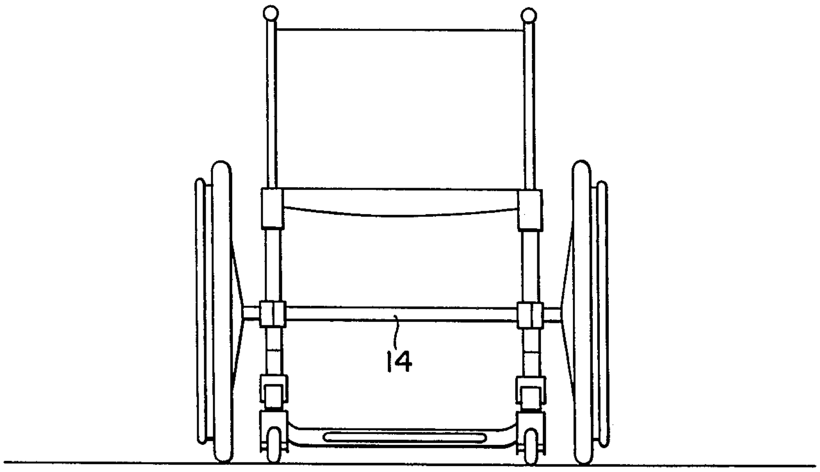
FIG. 2 is the lightweight wheelchair of FIG. 1 as seen from behind.

FIG. 2 shows a configuration of the rear axle 14 without camber adjustment at the two rear wheels 7 and 8 and therefore in this configuration the spirit level by which the axle position is able to be precisely centered is also omitted.

Figure 3:
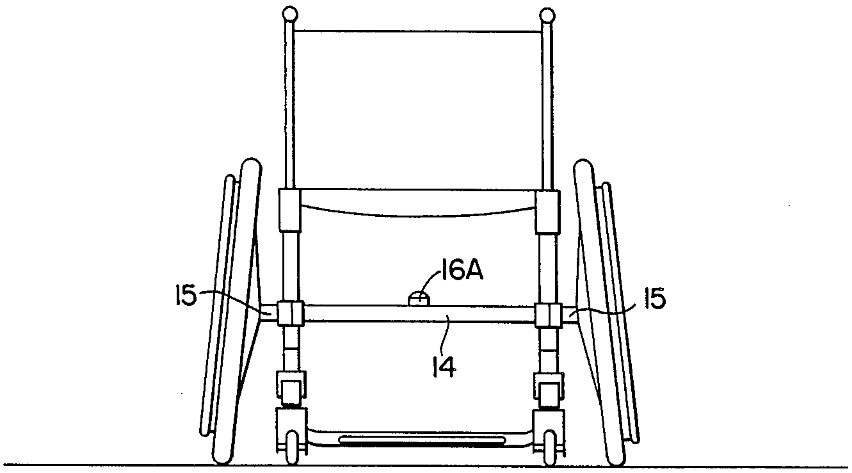
FIG. 3 is another embodiment of the lightweight wheelchair of FIG. 1 with the rear wheels displaying an inclined camber.
Figure 7:
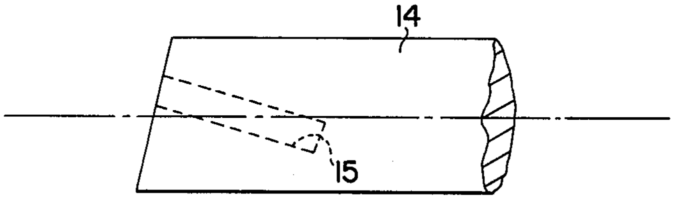
FIG. 7 is a fragmentary view of the rear axle showing an angled wheel-axle receiving bore.

FIG. 3 shows exactly the embodiment with cambered rear wheels. In this configuration angularly bored rear axle receiving devices or portions 15 are provided and one of which devices is shown in greater detail in FIG. 7. That again means for each different camber adjustment, wheel axles in such a lightweight wheelchair are adjustable, and the associated wheel axle, if it consists of a camber adjustable axle journal bore 15, then has, as said, a spirit level 16A in order to guarantee the centering.

Figure 4:
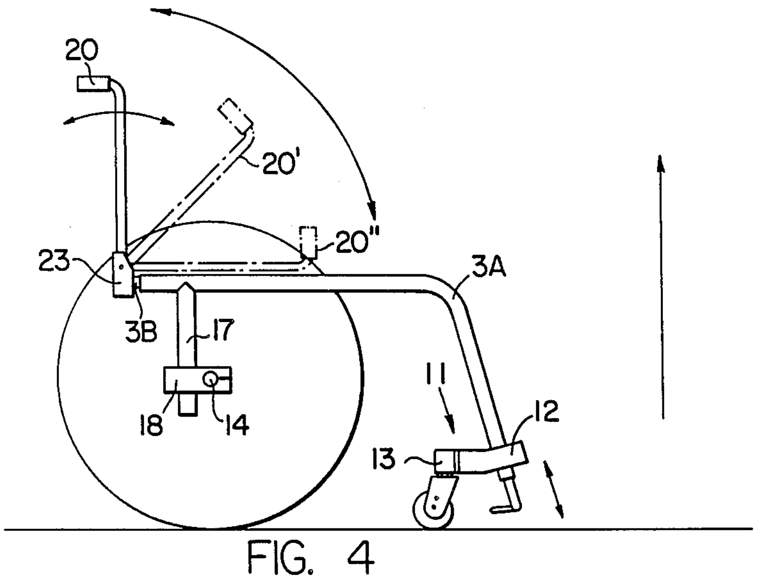
FIG. 4 is an illustration of the principles of the movement mechanism for the collapsible back rest in FIG. 1.

The lightweight wheelchair with the completely telescopically retracted frame bar pieces 3A and 3B (FIG. 4) has the seat position shifted completely forward in this illustrated position. Additionally these frame parts 3A and 3B are connected by means of a support element 17 and a corresponding retaining device 18 with the rear axle 14. The retaining device 18 is designed as a clamping device, for example from plastic or metal, and the support element 17 is infinitely adjustable in this retaining device 18 so that the actual seat height, which is illustrated by the frame bar sections 3A,3B can be adjusted as desired. Additionally an infinitely vertical adjustable suspension 11 is illustrated in FIG. 4 for the two front wheels 9 and 10. This adjustable suspension 11 consists of two parts, namely in one case a clamp connector 12 and connected with it for providing a variably positional and rotational support, a wheel journal 13 in which one or the other two front wheels 9 or 10 is guided. In addition also in FIG. 4 a limit hinge 23 is shown which sets up the connecting position between the two parts of the telescopically designed frame bar 3 at the handle 20. By means of this limit hinge 23, the whole backrest is brought into the positions 20′ and 20″ by means of the handles 20.

Figure 5:
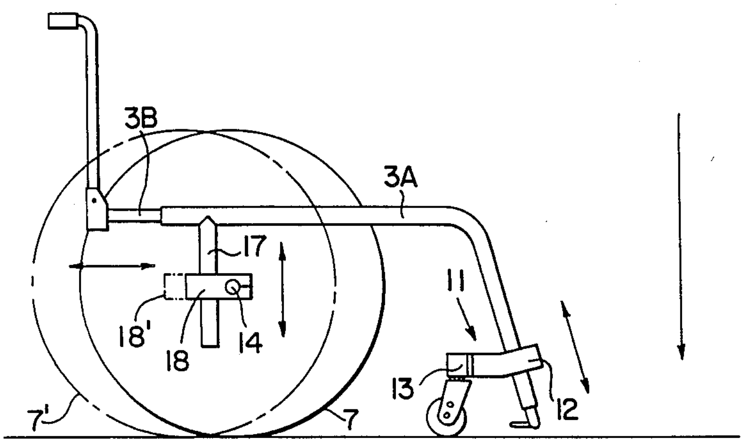
FIG. 5 is the lightweight wheelchair according to FIG. 1 with the seat surface extended rearwardly.

The counterpart of FIG. 4 is illustrated in FIG. 5, namely a completely extended telescopic-type second part of the frame bar 3B and a greatly lowered lightweight wheelchair in comparison to FIG. 4. In FIG. 5 of course, the support element 17 is shifted very much downwardly in the retaining device 18 and the same is likewise true for the clamp connector 12. Also the frame piece 3A and with it the foot support 19 have been lowered by a maximum amount toward the floor on which the chair is driven. In FIG. 5 the rear wheel 7 is shown in an extended and in a phantom position. The extended position illustrates the principle of the schematic structure. The phantom position 7′ and the phantom position of the retaining device 18′ go together. It is of course a further advantage in this construction that the retaining device 18 can be loosened only at the support elements 17 and can simply be rotated 180° with respect to the connector for the axle 14 to a new position of the rear axle 14 and thereby make possible a totally new range for the center of gravity.

Figure 6:
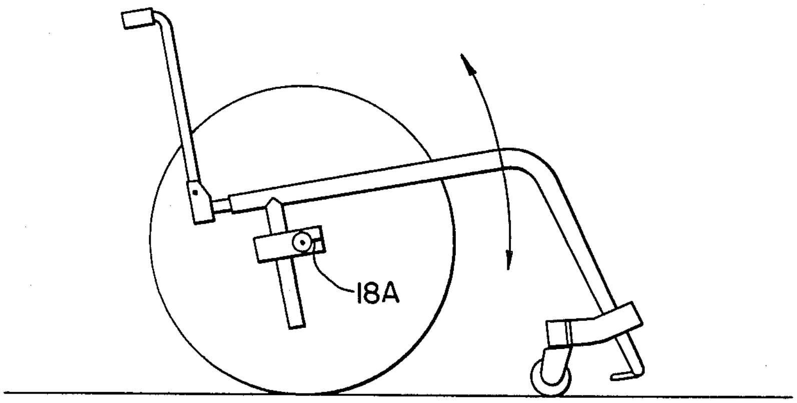
FIG. 6 is the lightweight wheelchair of FIG. 1 with the center of gravity shifted rearwardly.

In FIG. 6 a further possibility for adjusting for the center of gravity is illustrated in which of course the seat surface 5A between the two frame bars 3 and 4 extends rearwardly at a slight inclination. This allows the support element 17 to be lowered much further in the retaining device 18 so that the extraordinary elevation of the seat surface at the front can be achieved by means of the clamp connector 12 for the front wheels 9.

I claim:

1. A lightweight wheelchair (1) adjustable for a specific balance, comprising a seat (5) arranged on two frame bars (3,4) of a support frame (2), a backrest (6) connected with the support frame (2) two adjustable camber rear wheels (7,8) being vertically adjustable and rotatably connected to the support frame (2) and two front wheels (9,10) being vertically adjustable in relation to the rear wheels (7,8) characterized in that the frame bars (3,4) at the seat level (5) have at least two parts **(3*a*,3*b*) telescopically adjustable relative to one another and adjustably connecting the back rest with the support frame to selectively shift the position of the back rest relative to the seat, said two rear wheels (7,8) being interconnected with a common rear axle (14) having angled wheel-axle-receiving bores (15) and said rear axle (14)** being rotatably adjustably mounted with said support frame.

2. A lightweight wheelchair adjustable for a specific balance in accordance with claim 1 characterized in that the front wheels (9,10) are pivotally connected to the frame bars **(3*b*,4) by means of an infinitely adjustable suspension (11)**.

3. A lightweight wheelchair adjustable for a specific balance according to claim 2 characterized in that the infinitely adjustable suspension (11) is formed by means of a clamp connector (12) to which a wheel caster (13) is fastened for providing a variable positional rotational support for each of said two front wheels.

4. A lightweight wheel chair adjustable for a specific balance according to claim 1 characterized in that the seat (5) is comprised of a web (5A) and said backrest (6) also being comprised of a web (6A)

5. A lightweight wheelchair adjustable for a specific balance according to claim 1 characterized in that the backrest (6) is foldable down to the seat level (5) (FIG. 4).

6. A lightweight wheelchair adjustable for a specific balance according to claim 1 characterized in that the rear axle (14) includes a centering device (16) for adjustment of the wheel axle receiving bores (15).

7. A lightweight wheelchair adjustable for a specific balance according to claim 6 characterized in that the centering device (16) consists of a spirit level (16A).

8. A lightweight wheelchair adjustable for a specific balance according to claim 1 characterized in that the frame (2) and correspondingly its two frame bars (3,4) are connected to the rear axle (14) by means of support elements (17) and wherein said means by which the wheel axle receiving bores are rotatably adjustable is a retaining device or a clamping device (18).

9. A lightweight wheelchair adjustable for a specific balance according to claim 8 characterized in that the retaining device (18) consists of an infinitely adjustable clamping device (18A).

10. A lightweight wheelchair adjustable for a specific balance according to claim 1 characterized in that a rear axle is connected to the support frame (2) and corresponding to its two frame bars (3,4).

11. A lightweight wheelchair (1) adjustable for a specific balance, comprising a seat(5) arranged on two frame bars (3,4) of a support frame (2), a backrest (6) connected with the support frame (2), two adjustable camber rear wheels (7,8) being vertically adjustable and rotatably connected to the support frame (2) and two front wheels (9,10) being vertically adjustable in relation to the rear wheels (7,8) characterized in that said two rear wheels (7,8) being interconnected with a common rear axle (14) having angled wheel-axle-receiving bores (15) and said rear axle (14) being rotatably adjustably mounted with said support frame.

* * * * *